(12) United States Patent
Higuchi

(10) Patent No.: US 10,078,586 B2
(45) Date of Patent: Sep. 18, 2018

(54) OUT-OF-RANGE REFERENCE DETECTION DEVICE, METHOD, AND RECORDING MEDIUM

(71) Applicant: NEC Platforms, Ltd., Kawasaki-shi, Kanagawa (JP)

(72) Inventor: Yuri Higuchi, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 16 days.

(21) Appl. No.: 15/263,572

(22) Filed: Sep. 13, 2016

(65) Prior Publication Data

US 2017/0139828 A1 May 18, 2017

(30) Foreign Application Priority Data

Nov. 13, 2015 (JP) ................................. 2015-223209

(51) Int. Cl.
G06F 12/08 (2016.01)
G06F 12/06 (2006.01)
G06F 12/14 (2006.01)

(52) U.S. Cl.
CPC .......... *G06F 12/0684* (2013.01); *G06F 12/08* (2013.01); *G06F 12/1441* (2013.01); *G06F 2212/1024* (2013.01); *G06F 2212/152* (2013.01); *G06F 2212/657* (2013.01)

(58) Field of Classification Search
CPC ......... G06F 2212/152; G06F 2212/657; G06F 12/0684
USPC ........................................................ 711/163
See application file for complete search history.

(56) References Cited

U.S. PATENT DOCUMENTS

2013/0290635 A1* 10/2013 Craske ................ G06F 12/1441
711/118
2014/0006746 A1* 1/2014 Hildesheim ......... G06F 12/1036
711/206

FOREIGN PATENT DOCUMENTS

JP S60-114948 A 6/1985

* cited by examiner

*Primary Examiner* — Jasmine Song

(57) ABSTRACT

An out-of-range reference detection method according to an exemplary aspect of the invention includes: acquiring a mask value corresponding to a base address register number of a predetermined effective address from a mask value storage unit storing correspondence relationships between the base address register number of a base address register storing a base address of a segment and the mask value showing a size of a memory that can be continuously referred to from the base address, determining whether or not the effective address is outside the range of the mask value, and outputting a result of the determination.

10 Claims, 13 Drawing Sheets

OUT-OF-RANGE REFERENCE DETECTION DEVICE, METHOD, AND RECORDING MEDIUM

This application is based upon and claims the benefit of priority from Japanese Patent Application No. 2015-223209, filed on Nov. 13, 2015, the disclosure of which is incorporated herein in its entirety by reference.

TECHNICAL FIELD

The present invention relates to an out-of-range reference detection device, a method, and a recording medium, which detects whether or not an effective address is outside a memory range that can be referred to.

BACKGROUND ART

The segmented memory management system is one of the memory management systems for an information processing device. In the segmented memory management system, a program in a virtual address space is managed in units of segments of variable length.

In an information processing device adopting the segmented memory management system, when the virtual address space is generated, segment descriptors containing a base address field and a segment size field for the segment are stored in a segment table.

FIG. 10 shows an example of the segment table. A start address in the virtual address space of each segment is stored in the base address field. Further, the size of the segment is stored in the segment size field.

Further, in a method in which a virtual address to be referred to is specified by using a base address such as a base address specification method, an index address specification method, or the like, a base address register number and a relative address are stored in an operand field of an instruction. The base address is acquired from a base address register having the base address register number, the base address and the relative address are added, and whereby an effective address can be calculated.

On the other hand, referable segments are specified in a process to be executed. In an information processing device, when the effective address to be referred to is outside the range of the segment that can be referred to, it is determined as "out-of-range reference exception" and an exception processing is executed to the out-of-range reference exception.

As a method for detecting an out-of-range reference, for example, there is a method described in Patent literature 1 in which a segment size corresponding to the segment to be referred to is acquired by searching the segment table and it is determined whether or not the relative address of the effective address is smaller than the segment size.

[Patent literature 1] Japanese Patent Application Laid-Open No. 1985-114948

However, in the method described in Patent literature 1, first, it is necessary to identify a segment number of the segment to be referred to in order to acquire the segment size corresponding to the segment to be referred to from the segment table. Because the segment number is included in a part of the base address, the segment number can be identified by reading the base address from the base address register corresponding to the base address register number included in the operand field of the instruction. By searching a base address field of the segment table by using the segment number as a key, the segment size corresponding to the segment to be referred can be acquired.

Thus, in order to acquire the segment size corresponding to the segment to be referred to from the segment table, first, the base address register is read, the segment number is identified and further, it is necessary to search the segment table. Therefore, it takes a long time to acquire the segment size.

Further, in the method in which the segment table is searched, when the segment table is complicated, it may take a long time to search the segment table.

When one segment table is used, the segment table is searched by using the segment number of the base address register as the key, as shown in FIG. 11. In contrast, for example, when a multi-process is performed, as shown in FIG. 12, the segment table may be provided for each process because each process has an independent virtual address space. In such a case, it is necessary to identify the segment table of the process on the basis of the process number and then, to acquire the segment size corresponding to the segment number.

Further, when there are many segments, a field of the segment number is divided into some groups and multiple tables may be configured, as shown in FIG. 13. When such configuration is used, a case in which a plurality of segment tables have to be searched may occur. In an example shown in FIG. 13, the field of the segment number is divided into two groups: UPPER and LOWER, and the segment table is provided for only the UPPER group. In this example, it is necessary to identify the segment table corresponding to a segment number UPPER and then, to acquire the segment size corresponding to a segment number LOWER.

In many cases, the segment table is stored in the memory. Accordingly, when the table is complicated, the number of times of accessing to the memory increases and it takes a further long time to search the segment table.

SUMMARY

An exemplary object of the invention is to provide an out-of-range reference detection device, a method and a recording medium which can make an out-of-range reference determination at high speed.

An out-of-range reference detection device according to an exemplary aspect of the invention includes: an acquisition unit that acquire a mask value corresponding to a base address register number of a predetermined effective address from a mask value storage unit storing correspondence relationships between the base address register number of a base address register storing a base address of a segment and the mask value showing a size of a memory that can be continuously referred to from the base address, a determination unit that determine whether or not the effective address is outside the range of the mask value, and an output unit that output a result of the determination.

An out-of-range reference detection method according to an exemplary aspect of the invention includes: acquiring a mask value corresponding to a base address register number of a predetermined effective address from a mask value storage unit storing correspondence relationships between the base address register number of a base address register storing a base address of a segment and the mask value showing a size of a memory that can be continuously referred to from the base address, determining whether or not the effective address is outside the range of the mask value, and outputting a result of the determination.

A computer-readable recording medium recording an out-of-range reference detection program according to an exemplary aspect of the invention characterized in that the out-of-range reference detection program causes a computer to realize: an acquisition function to acquire a mask value corresponding to a base address register number of a predetermined effective address from a mask value storage unit storing correspondence relationships between the base address register number of a base address register storing a base address of a segment and the mask value showing a size of a memory that can be continuously referred to from the base address, a determination function to determine whether or not the effective address is outside the range of the mask value, and an output function to output a result of the determination.

BRIEF DESCRIPTION OF THE DRAWINGS

The above and other objects, features and advantages of the present invention will become more apparent from the following detailed description when taken in conjunction with the accompanying drawings wherein.

EXEMPLARY EMBODIMENT

First Exemplary Embodiment

A first exemplary embodiment of the present invention will be described.

Figure 1:
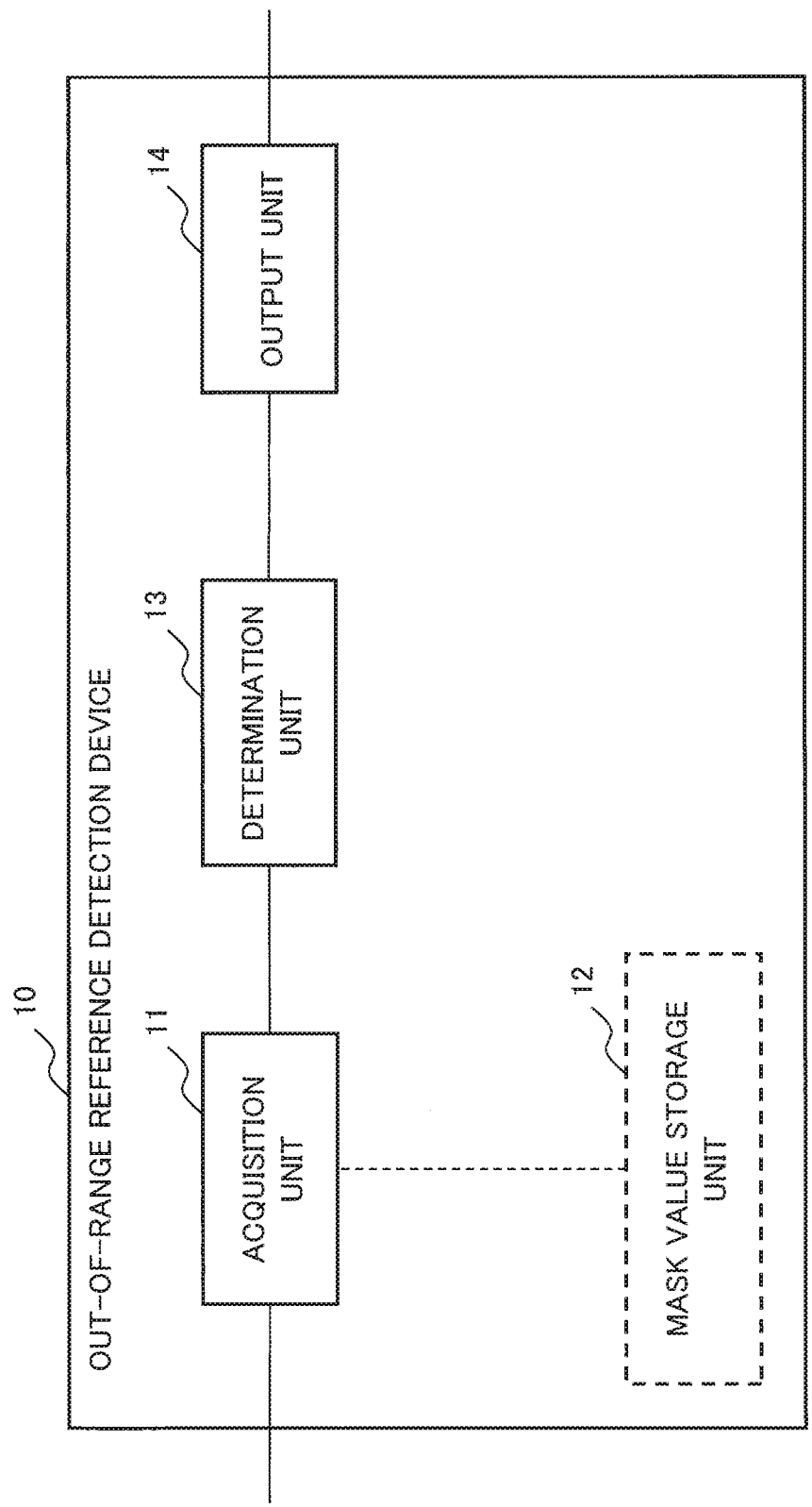
FIG. 1 shows an example of a configuration of an out-of-range reference detection device according to first and second exemplary embodiments of the present invention.

FIG. 1 shows an example of a configuration of an out-of-range reference detection device 10. The out-of-range reference detection device 10 according to this exemplary embodiment includes an acquisition unit 11, a determination unit 13, and an output unit 14.

The acquisition unit 11 acquires a mask value corresponding to the base address register number of a predetermined effective address from a mask value storage unit 12. The mask value storage unit 12 stores correspondence relationships between the base address register number of the base address register storing the base address of the segment and the mask value showing a size of the memory that can be continuously referred to from the base address.

The determination unit 13 determines whether or not the effective address is outside the range of the mask value. The output unit 14 outputs a result of the determination.

The out-of-range reference detection device 10 has the configuration described above and whereby, the out-of-range reference detection device 10 acquires the mask value from the mask value storage unit 12. Accordingly, it is possible to directly acquire the mask value corresponding to the base address register number included in the operand field of the instruction from the mask value storage unit 12 without acquiring the segment number or searching the segment table. Therefore, the out-of-range reference determination can be made at high speed.

Figure 2:
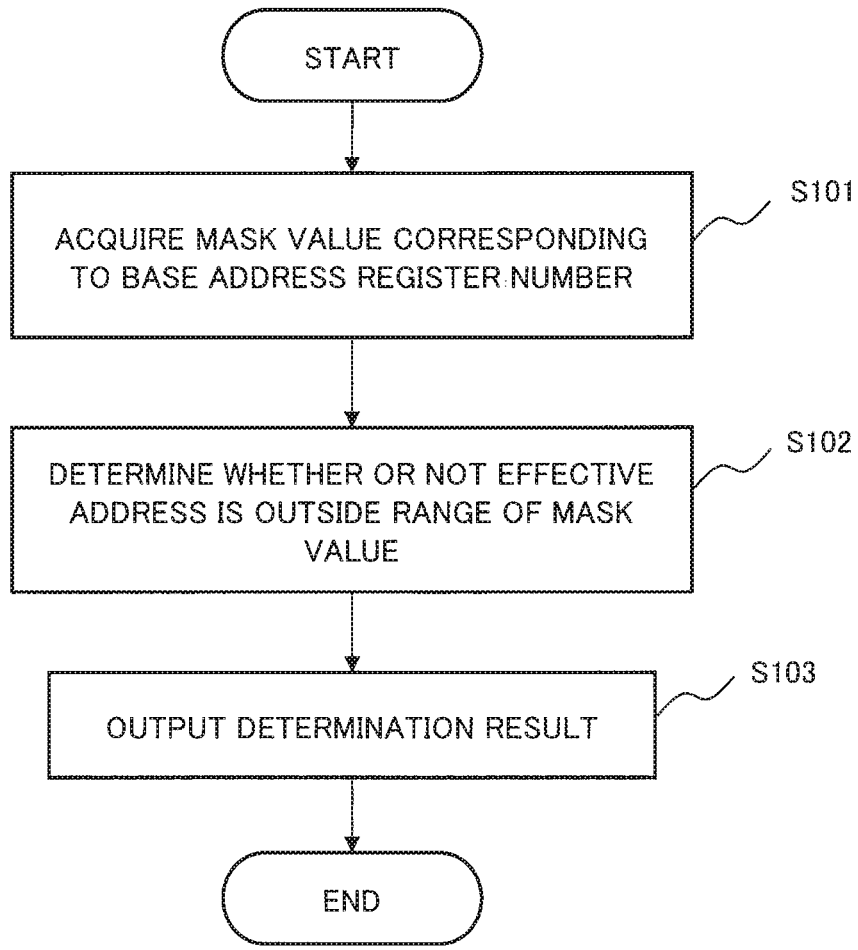
FIG. 2 shows an example of operation of an out-of-range reference detection device according to a first exemplary embodiment of the present invention.

Next, an example of the operation of the out-of-range reference detection device 10 according to this exemplary embodiment is shown in FIG. 2.

First, the acquisition unit 11 of the out-of-range reference detection device 10 acquires the mask value corresponding to the base address register number of the predetermined effective address from the mask value storage unit 12 (step S101). Next, the determination unit 13 determines whether or not the effective address is outside the range of the mask value (step S102). The output unit 14 outputs a result of the determination (step S103).

The out-of-range reference detection device 10 operates as mentioned above and whereby the out-of-range reference detection device 10 acquires the mask value from the mask value storage unit 12. Accordingly, it is possible to directly acquire the mask value corresponding to the base address register number included in the operand field of the instruction from the mask value storage unit 12 without acquiring the segment number or searching the segment table. Therefore, the out-of-range reference determination can be made at high speed.

As described above, in the first exemplary embodiment of the present invention, the mask value is acquired from the mask value storage unit storing the mask value corresponding to the base address register number. As a result, it is possible to directly acquire the mask value corresponding to the base address register number included in the operand field of the instruction from the mask value storage unit without acquiring the segment number or searching the segment table. Therefore, the out-of-range reference determination can be made at high speed.

Second Exemplary Embodiment

Next, a second exemplary embodiment of the present invention will be described.

In this exemplary embodiment, a case in which correct mask values are stored in the mask value storage unit 12 in advance will be described specifically.

An example of a configuration of an out-of-range reference detection device 10 according to a second exemplary embodiment is the same as that of the out-of-range reference detection device 10 according to the first exemplary embodiment (shown in FIG. 1).

In this exemplary embodiment, the mask values corresponding to each base address register number are stored in the mask value storage unit 12 in advance. The mask value storage unit 12 can be provided inside or outside the out-of-range reference detection device 10. For example, the mask value storage unit 12 may be secured in the main storage memory or assigned to the register. The base address register stores the base address (the start address) of each segment and the base address register number is used for identifying the base address register. Further, the mask value represents the size of the memory that can be continuously referred to from the base address. It is desirable that this memory size is equal to the number of the addresses included in the range in which the address can be continuously referred to.

When another segment which can be continuously referred to from the segment beyond the segment boundary doesn't exist, the mask value of the segment is equal to the segment size. However, another segment which can be continuously referred to from the segment beyond the segment boundary may exist. In the method described in Patent literature 1, the segment size is acquired from the segment table and it is determined whether or not the out-of-range reference occurs on the basis of the acquired segment size. Accordingly, when the method described in Patent literature 1 is used, even when another segment that can be continuously referred to from the segment beyond the segment boundary exists, it is determined that the out-of-range reference occurs when the another segment is continuously referred to from the segment beyond the segment boundary. Therefore, in this exemplary embodiment, the total size of the segments which can be continuously referred to is defined as the mask value. Thus, by defining the total size of the segments which can be continuously referred to as the mask value, even when the another segment which can be continuously referred to from the segment exists and the another segment is referred to, it can be correctly determined whether or not the out-of-range reference occurs.

Figure 3:
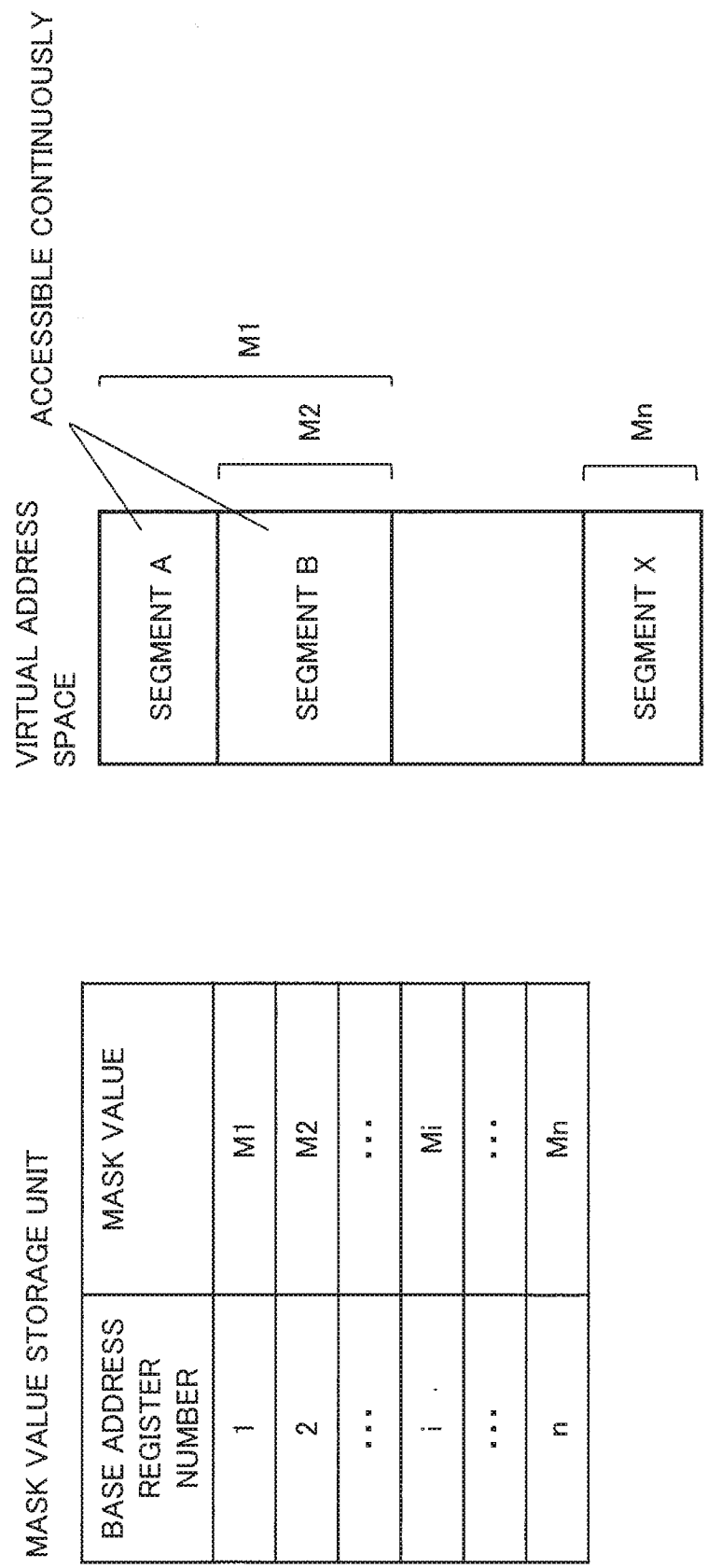
FIG. 3 shows an example of a mask value in each exemplary embodiment of the present invention.

FIG. 3 shows an example of the mask value stored in the mask value storage unit 12. In this example, Mi is the mask value corresponding to the base address register number i (i=1 to n). Further, in this example, because a segment A corresponding to a base address register number 1 and a segment B can be continuously referred to, a mask value M1 corresponding to the base address register number 1 is equal to the total of the segment sizes of the segment A and the segment B.

The acquisition unit 11 acquires the mask value corresponding to the base address register number of the predetermined effective address from the mask value storage unit 12. The base address register number is included in the operand field of the instruction. In case of an example shown in FIG. 3, the mask value Mi corresponding to the base address register number i (i=1 to n) is acquired.

The determination unit 13 determines whether or not the effective address to be referred to is outside the range that can be referred to. When the mask value is Mi, it is determined whether or not the effective address is in the range of the mask value Mi from the base address.

The output unit 14 outputs a result of the determination. Namely, the output unit 14 outputs information indicating whether or not the out-of-range reference occurs.

The out-of-range reference detection device 10 has the configuration described above and whereby, the out-of-range reference detection device 10 acquires the mask value from the mask value storage unit 12. Accordingly, it is possible to directly acquire the mask value corresponding to the base address register number included in the operand field of the instruction from the mask value storage unit 12 without acquiring the segment number or searching the segment table. Therefore, the out-of-range reference determination can be made at high speed.

Further, in this exemplary embodiment, the mask value is made equal to the size of the memory that can be continuously referred to from the base address. Therefore, even when another segment that can be continuously referred to from the segment beyond the segment boundary exists, it can be correctly determined whether or not the out-of-range reference occurs.

Next, an example of the operation of the out-of-range reference detection device 10 will be described by using FIG. 4 and FIG. 5.

Figure 4:
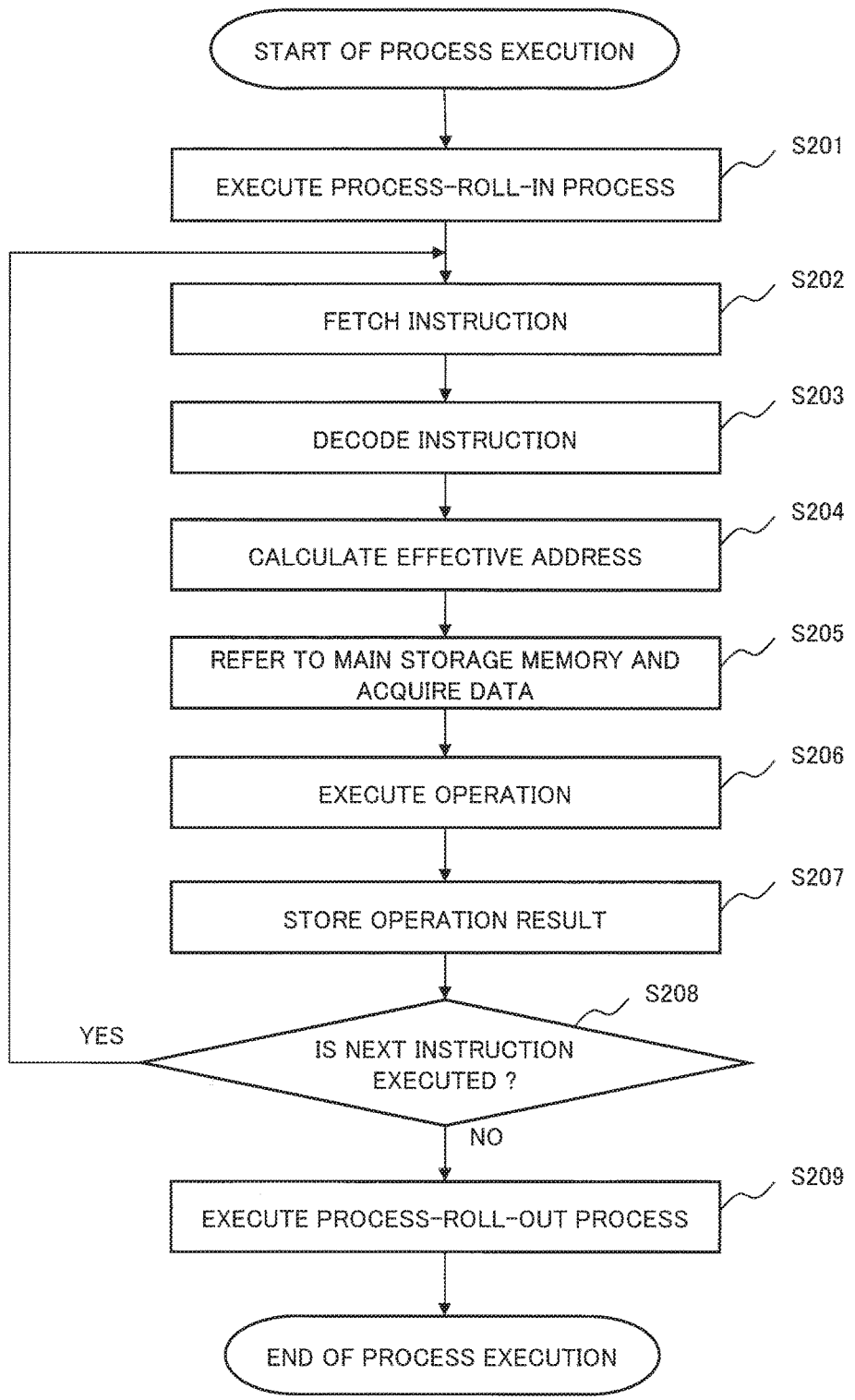
FIG. 4 shows an example of a series of operation from a process roll-in to a process roll-out in each exemplary embodiment of the present invention.

FIG. 4 is a flowchart showing a series of operation from a process roll-in to a process roll-out when the computer performs a process. In this exemplary embodiment, a case in which an arithmetical instruction is executed will be described.

Figure 5:
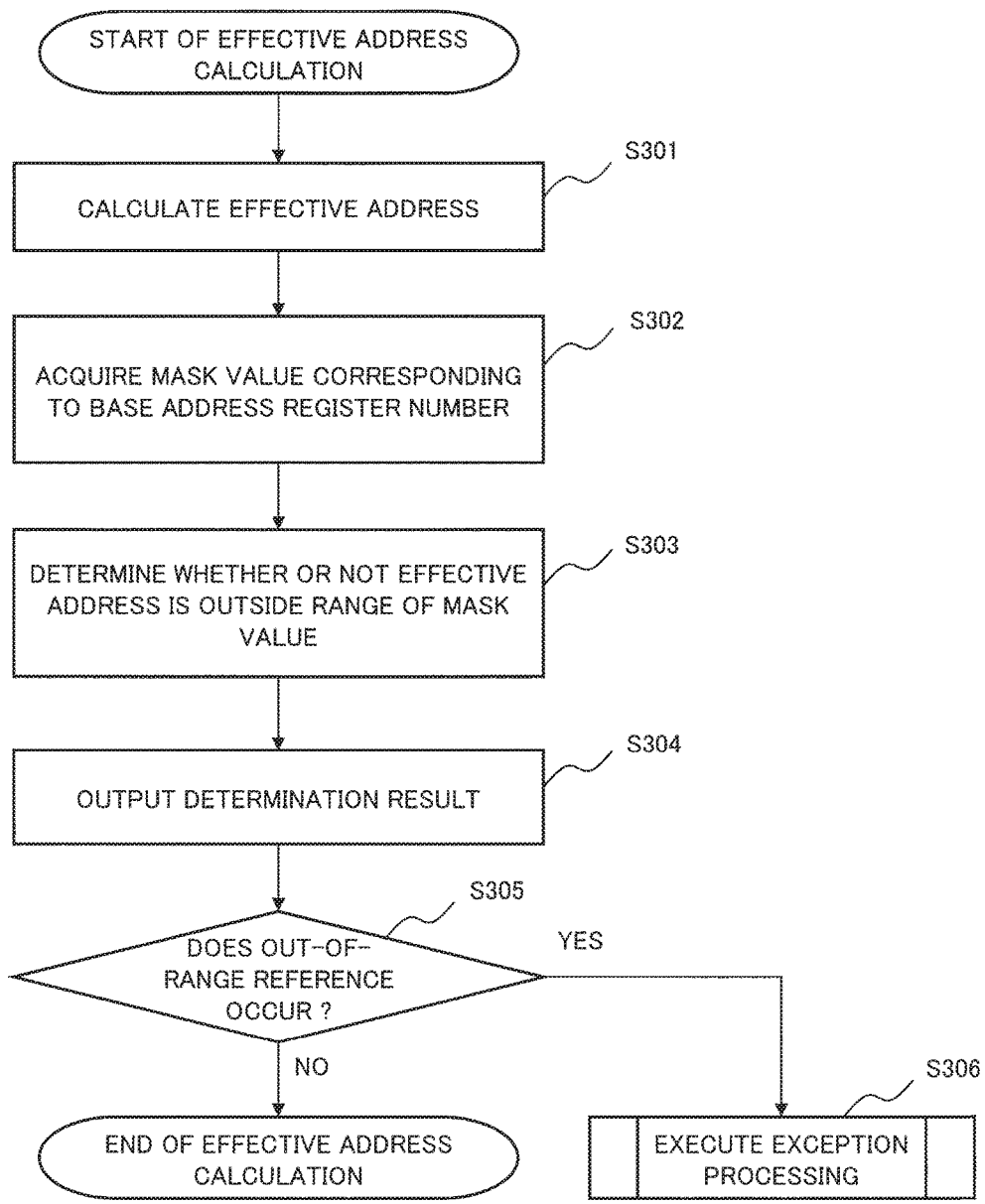
FIG. 5 shows an example of operation of an effective address calculation in second and third exemplary embodiments of the present invention.

FIG. 5 is a figure showing an example of the detailed operation of the effective address calculation of step S204 shown in FIG. 4. The out-of-range reference detection device 10 according to this exemplary embodiment performs the processes from step S302 to step S304 in FIG. 5. The out-of-range reference detection device 10 determines whether or not the effective address referred to by the instruction of the process is in the range that can be referred to.

When the computer starts to execute the process, first, the computer executes a process-roll-in process (step S201). Next, the computer fetches the instruction (step S202) and decodes the fetched instruction (step S203). The computer calculates the effective address according to the decoded instruction (step S204), refers to the main storage memory that corresponds to the effective address, and acquires data required for the arithmetic operation (step S205). Next, the computer executes the arithmetic operation according to the decoded instruction (step S206) and stores a result of the arithmetic operation in a register or the main storage memory (step S207). If a next instruction is present (step S208), the process goes back to step S202 and if a next instruction is absent, the computer executes a process-roll-out process (step S209) to end the process.

Next, an example of the detailed operation of the effective address calculation of step S204 will be described by using FIG. 4.

First, the effective address is calculated on the basis of the base address register number, an index register number, an offset (relative address), and the like, that are included in the operand field of the instruction decoded in step S203 of FIG. 4 (step S301). Further, the mask value corresponding to the base address register number included in the operand field of the instruction is acquired from the mask value storage unit 12 (step S302).

Next, it is determined whether or not the effective address calculated in step S301 is outside the range that can be referred to by using the mask value acquired in step S302 (step S303). More specifically, because a plurality of effective addresses may be referred to at one time, it is determined whether or not the maximum value of the effective address referred to by this instruction is in the virtual address range from the base address to the address calculated by: base address+mask value−1. Alternatively, by determining whether or not the maximum value of the relative address of the effective address referred to by this instruction is greater than a value calculated by: mask value−1, it can be determined whether or not the out-of-range reference occurs.

For example, when the base address is Ai and the mask value is Mi, it is determined whether or not the maximum value of the effective address to be referred to is greater than a value calculated by an equation of (Ai+Mi−1) or whether or not the maximum value of the relative address of the effective address to be referred to is greater than a value calculated by an equation of (Mi−1).

The output unit 14 outputs a result of the determination. Namely, the output unit 14 outputs information indicating whether or not the out-of-range reference is detected. When the determination result outputted by the output unit 14 shows that the out-of-range reference occurs, the computer executes the exception processing to the out-of-range reference exception (step S306).

When the out-of-range reference detection device 10 operates as described above, the out-of-range reference detection device 10 acquires the mask value from the mask value storage unit 12. Accordingly, it is possible to directly acquire the mask value corresponding to the base address register number included in the operand field of the instruction from the mask value storage unit 12 without acquiring the segment number or searching the segment table. Therefore, the out-of-range reference determination can be made at high speed.

As described above, in the second exemplary embodiment of the present invention, the mask value is acquired from the mask value storage unit storing the mask value corresponding to the base address register number like the first exemplary embodiment. As a result, it is possible to directly acquire the mask value corresponding to the base address register number included in the operand field of the instruction from the mask value storage unit without acquiring the segment number or searching the segment table. Therefore, the out-of-range reference determination can be made at high speed.

Further, in this exemplary embodiment, the mask value is made equal to the size of the memory that can be continuously referred to from the base address. Therefore, even when another segment that can be continuously referred to from the segment beyond the segment boundary exists, it can be correctly determined whether or not the out-of-range reference occurs.

Third Exemplary Embodiment

Next, a third exemplary embodiment of the present invention will be described.

In this exemplary embodiment, an out-of-range reference detection device including a unit for generating the mask value will be described.

Figure 6:
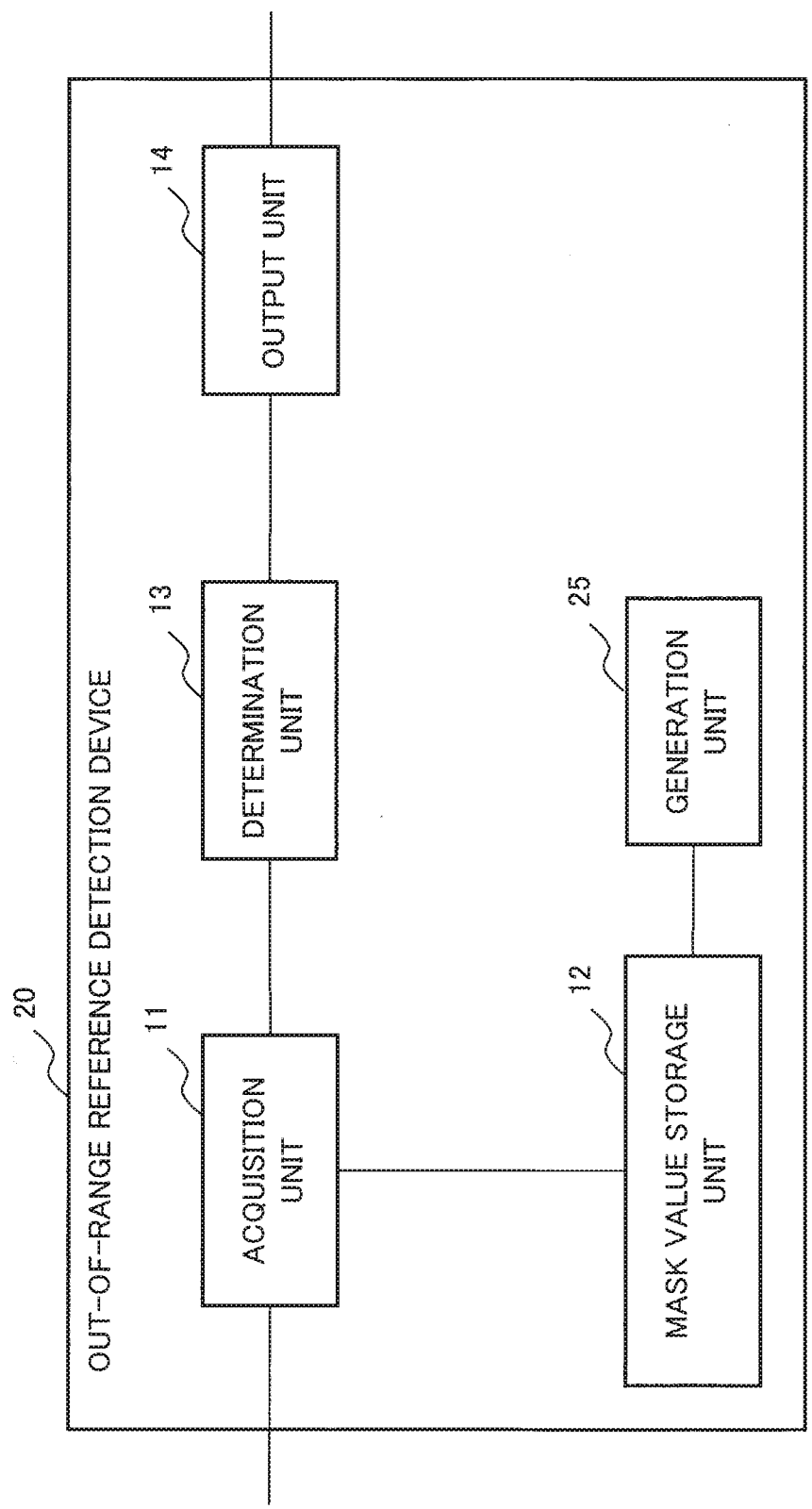
FIG. 6 shows an example of a configuration of an out-of-range reference detection device according to a third exemplary embodiment of the present invention.

FIG. 6 shows an example of a configuration of an out-of-range reference detection device 20 according to this exemplary embodiment. In the out-of-range reference detection device 20, a generation unit 25 is added to the out-of-range reference detection device 10.

The generation unit 25 generates the mask value corresponding to each base address register number and stores it in the mask value storage unit 12. The generation unit 25 determines the mask value on the basis of an execution condition of the process: for example, whether or not another segment that can be continuously referred to from the segment beyond the segment boundary exists, a segment configuration: for example, whether the segment size is fixed or variable, and the like.

The unit other than the generation unit 25 is the same as that of the second exemplary embodiment. Therefore, the description will be omitted.

The out-of-range reference detection device 20 has the configuration described above and whereby, the out-of-range reference detection device 20 stores the mask value corresponding to the base address register number in the mask value storage unit 12. Accordingly, it is possible to directly acquire the mask value corresponding to the base address register number included in the operand field of the instruction from the mask value storage unit 12 without acquiring the segment number or searching the segment table. Therefore, the out-of-range reference determination can be made at high speed.

The operation other than the mask value generating operation of the out-of-range reference detection device 20 is the same as that of the out-of-range reference detection device 10 according to the second exemplary embodiment (shown in FIG. 4 and FIG. 5 as the example). It is desirable to generate the mask value corresponding to each base address register number at one time or less in order to shorten the time required for generating the mask value as much as possible. For example, when the mask value is generated after performing the process-roll-in process of step S201 shown in FIG. 4, the mask value corresponding to each base address register number can be generated at one time.

When the out-of-range reference detection device 20 operates as mentioned above, the out-of-range reference determination can be made at high speed.

As described above, in the third exemplary embodiment of the present invention, the mask value corresponding to the base address register number is stored in the mask value storage unit. As a result, it is possible to directly acquire the mask value corresponding to the base address register number included in the operand field of the instruction from the mask value storage unit without acquiring the segment number or searching the segment table. Therefore, the out-of-range reference determination can be made at high speed.

Fourth Exemplary Embodiment

Next, a fourth exemplary embodiment of the present invention will be described.

In this exemplary embodiment, the mask value can be more efficiently generated compared with the third exemplary embodiment and the mask value can be generated only when it is required. These will be described below.

Figure 7:
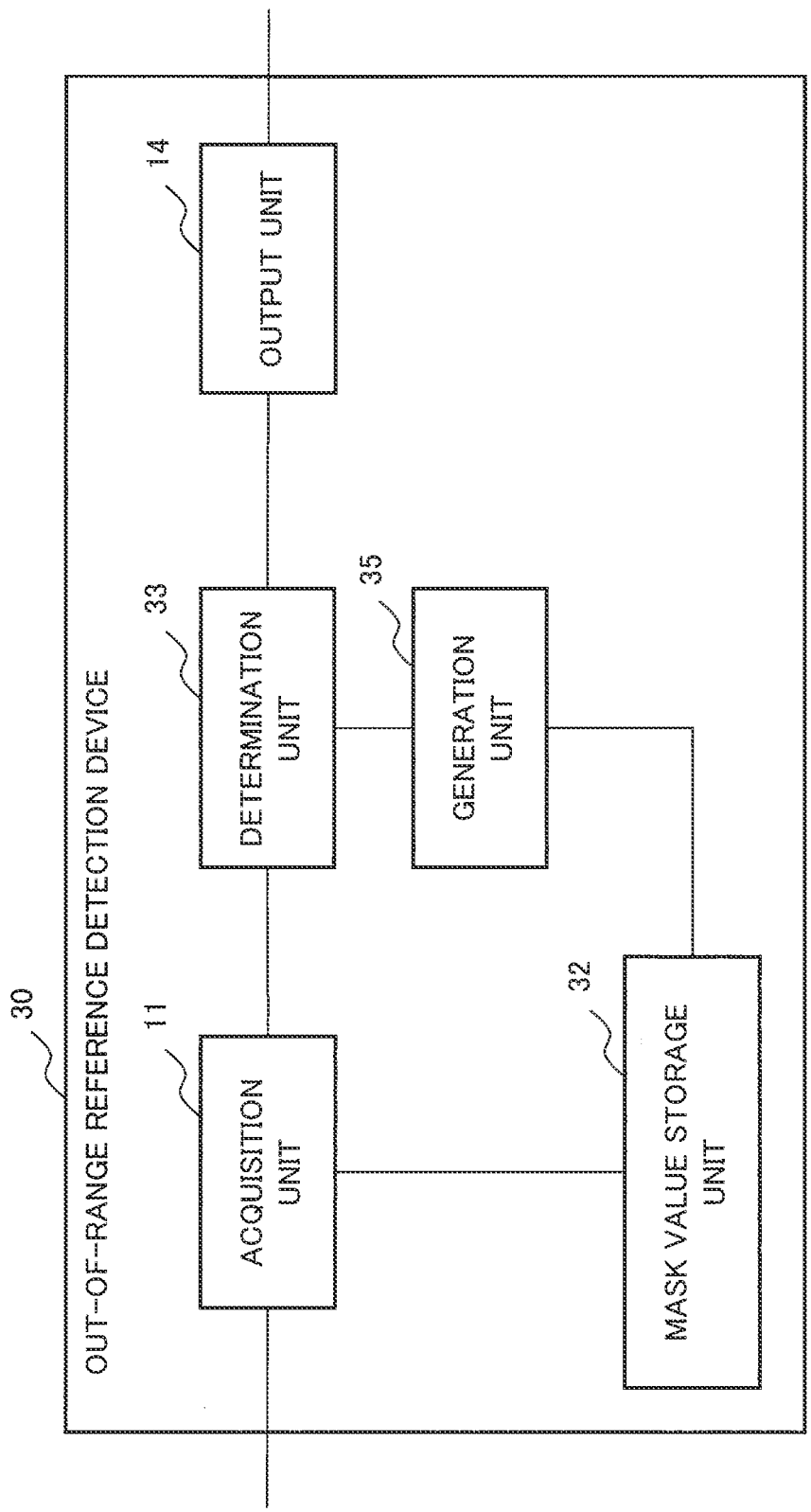
FIG. 7 shows an example of a configuration of an out-of-range reference detection device according to a fourth exemplary embodiment of the present invention.

FIG. 7 shows an example of a configuration of an out-of-range reference detection device 30 according to this exemplary embodiment. The out-of-range reference detection device 30 includes the acquisition unit 11, a mask value storage unit 32, a determination unit 33, a generation unit 35, and the output unit 14. The acquisition unit 11 and the output unit 14 of the out-of-range reference detection device 30 according to the fourth exemplary embodiment are the same as those of the out-of-range reference detection device 10 according to the second exemplary embodiment and those of the out-of-range reference detection device 20 according to the third exemplary embodiments.

Initial values of the mask value corresponding to each base address register number are stored in the mask value storage unit 32 at the time of the start of the process. For example, the value that is smaller than the minimum size of each segment is designated as the initial value. When the initial value is designated as described above, the correct mask value is equal to or greater than the value of the minimum size of each segment. Therefore, it can be easily determined that the mask value is equal to the initial value. In the following explanation, it will be assumed that the initial value of the mask value is zero.

The acquisition unit 11 acquires the mask value corresponding to the base address register number included in the operand field of the instruction from the mask value storage unit 32.

The determination unit 33 determines whether or not the effective address is in the range that can be referred to by using the mask value acquired by the acquisition unit 11. Further, in this exemplary embodiment, when the generation unit 35 generates a new mask value, it is determined whether or not the effective address is in the range that can be referred to by using the new mask value as the second determination.

The generation unit 35 generates the new mask value when a result of the determination by the determination unit 33 shows that the out-of-range reference occurs and the mask value is equal to the initial value. The generation unit 25 determines the mask value on the basis of an execution condition of the process: for example, whether or not another segment that can be continuously referred to from the segment beyond the segment boundary exists, a segment configuration: for example, whether the segment size is fixed or variable, and the like.

The out-of-range reference detection device 30 has the configuration described above and whereby, the out-of-range reference detection device 30 stores the mask value corresponding to the base address register number in the mask value storage unit 32. Accordingly, it is possible to directly acquire the mask value corresponding to the base address register number included in the operand field of the instruction from the mask value storage unit without acquiring the segment number or searching the segment table. Therefore, the out-of-range reference determination can be made at high speed.

Further, in this exemplary embodiment, the new mask value is generated only when it is determined that the out-of-range reference occurs and the mask value is equal to the initial value. Therefore, the mask value is generated to only the base address register number for which the mask value is required and whereby the mask value can be generated a higher speed.

Figure 8:
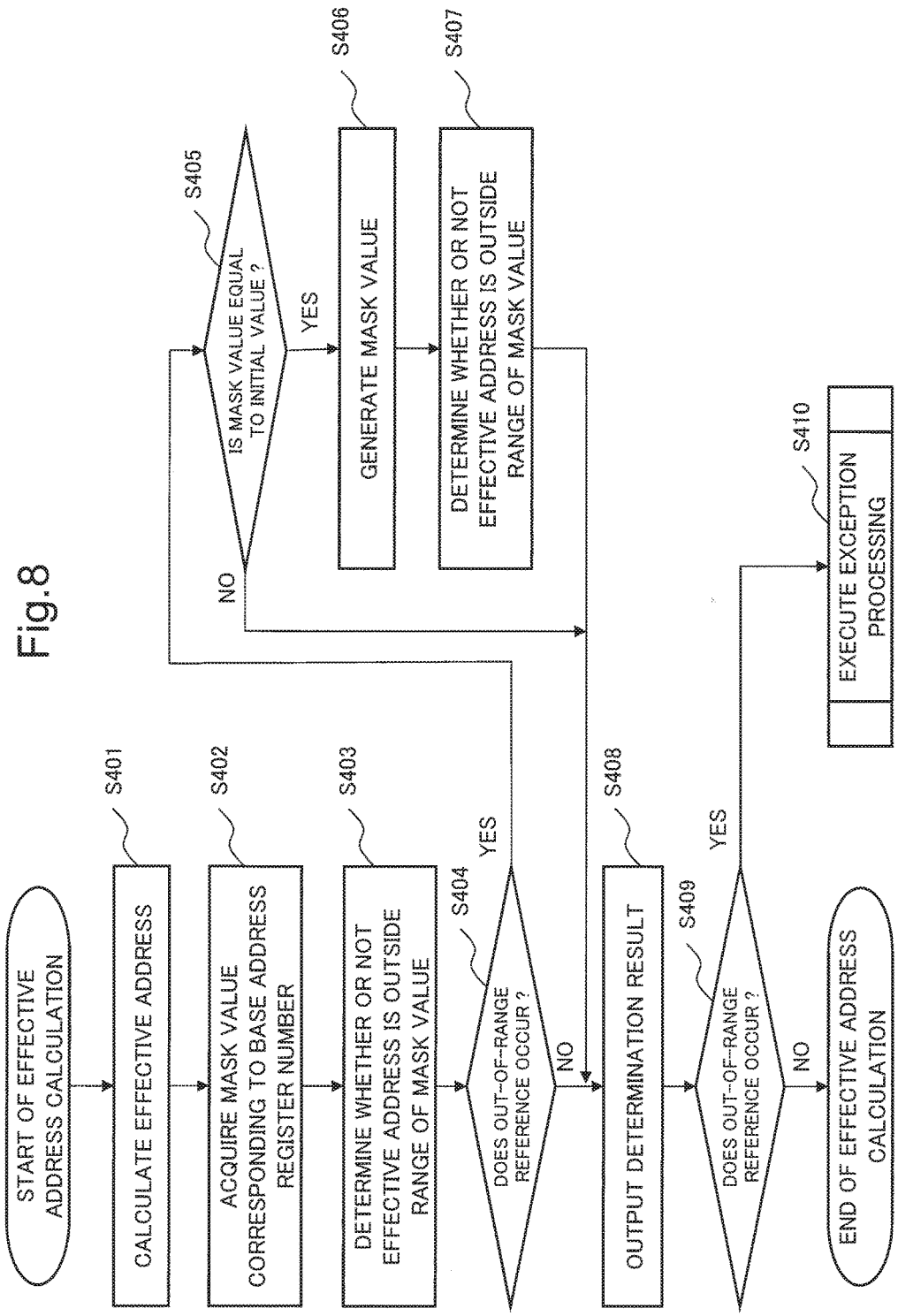
FIG. 8 shows an example of operation of an effective address calculation in a fourth exemplary embodiment of the present invention.

FIG. 8 shows an example of the detailed operation of the effective address calculation of step S204 shown in FIG. 4. The out-of-range reference detection device 30 according to this exemplary embodiment performs the processes from step S402 to step S408 shown in FIG. 8.

First, the initial values of the mask value are stored in the mask value storage unit 32 after the process-roll-in process of step S201 of FIG. 4 or another process. In this exemplary embodiment, the mask value of all the base address registers is set to zero.

In the effective address calculation of step S204, first, the effective address is calculated on the basis of the base address register number, the index register number, and the like that are included in the instruction decoded in step S203 of FIG. 4 (step S401). Further, the mask value Mi corresponding to the base address register number i included in the operand field of the instruction is acquired from the mask value storage unit 32 (step S402).

Next, it is determined whether or not the effective address calculated in step S401 is in the range that can be referred to by using the mask value acquired in step S402 (step S403). The above-explained processes from step S401 to step S403 are similar to the processes from step S301 to step S303 shown in FIG. 5.

In this exemplary embodiment, when a result of the determination of step S403 shows that the out-of-range reference occurs (Yes in step S404) and the mask value is equal to the initial value (Yes in step S405), the correct mask value is generated (step S406). The generation unit 35 determines the mask value on the basis of the execution condition of the process and the configuration of the segment and stores it in the mask value storage unit 32. The determination unit 33 determines whether or not the effective address is in the range that can be referred to by using the mask value generated by the generation unit 35 (step S407).

In this exemplary embodiment, the initial value of the mask value Mi is set to zero. Therefore, when the base address register number used for the effective address calculation is the base address register number that is first used after the process-roll-in process, the result of the determination of step S404 is certainly "Yes". The newly generated mask value is stored in the mask value storage unit 32.

By storing the newly generated mask value in the mask value storage unit 32, unless the value of the base address register is changed, this newly generated mask value can be used when it is determined whether or not the out-of-range reference occurs by using the same base address register.

When the base address register number used for the effective address calculation is the base address register number that is used one or more times after the process-roll-in process, the mask value is changed to the newly generated mask value. Therefore, the out-of-range reference determination can be correctly made in step S403. Therefore, even when it is determined in step S404 that the out-of-range reference occurs, because the mask value is changed to the newly generated mask value that is not equal to the initial value in step S405, the mask value is not newly generated in step S406.

The output unit 14 outputs a result of the determination of step S403 when it is determined that the out-of-range reference does not occur in step S404 or when it is determined that the mask value is not equal to the initial value in step S405. The output unit 14 outputs a result of the determination of step S407 when it is determined that the mask value is equal to the initial value in step S405 (step S408). When the determination result outputted by the output unit 14 shows that the out-of-range reference occurs (step S409), the computer executes the exception processing to the out-of-range reference exception (step S410).

When the out-of-range reference detection device 30 operates as described above, the out-of-range reference detection device 30 stores the mask value corresponding to the base address register number in the mask value storage unit 32. Accordingly, it is possible to directly acquire the mask value corresponding to the base address register number included in the operand field of the instruction from the mask value storage unit without acquiring the segment number or searching the segment table. Therefore, the out-of-range reference determination can be made at high speed.

Further, in the above-mentioned description, it is assumed that the initial value of the mask value is zero. However, a value obtained by subtracting a predetermined value (for example, 1) from the segment size of the segment corresponding to the base address of each base address register number can be used as the initial value of the mask value. When the initial value of the mask value is determined in such manner, it is determined in step S404 of FIG. 8 that the out-of-range reference does not occur (NO) except for a case in which the effective address is near the boundary between its own segment and another segment. Therefore, the number of times of generating the mask value can be further reduced.

Here, when the segment size of each segment is used as the initial value, the correct mask value used when no another segment that can be continuously referred to exists is equal to the initial value. Accordingly, it is difficult to determine whether or not the mask value is equal to the initial value in step S405. Therefore, it is desirable that the value obtained by subtracting the predetermined value from the segment size is used as the initial value.

As have been explained above, in the fourth exemplary embodiment of the present invention, the mask value corresponding to the base address register number is stored in the mask value storage unit like the third exemplary embodiment. As a result, it is possible to directly acquire the mask value corresponding to the base address register number included in the operand field of the instruction from the mask value storage unit without acquiring the segment number or searching the segment table. Therefore, the out-of-range reference determination can be made at high speed.

Further, in this exemplary embodiment, the mask value is generated only when it is determined that the out-of-range reference occurs and the mask value is equal to the initial value. Therefore, only the mask value corresponding to the base address register number that is required is generated and whereby the mask value can be generated a higher speed.

Further, in each exemplary embodiment that has been explained above, it is assumed that the information processing device uses the segmented memory management system. However, each of the above-described exemplary embodiments can be applied to the information processing device using a paged segmentation system.

[Example of Hardware Configuration]

An example of the configuration of the hardware resources which realizes the above-mentioned out-of-range reference detection device (10, 20, or 30) according to each exemplary embodiment of the present invention by using one information processing device (computer) will be described. Further, the out-of-range reference detection device may be realized by using at least two physical (or functional) information processing devices. Further, the out-of-range reference detection device may be realized as a dedicated device. Further, a part of the function of the out-of-range reference detection device may be realized by using the information processing device.

Figure 9:
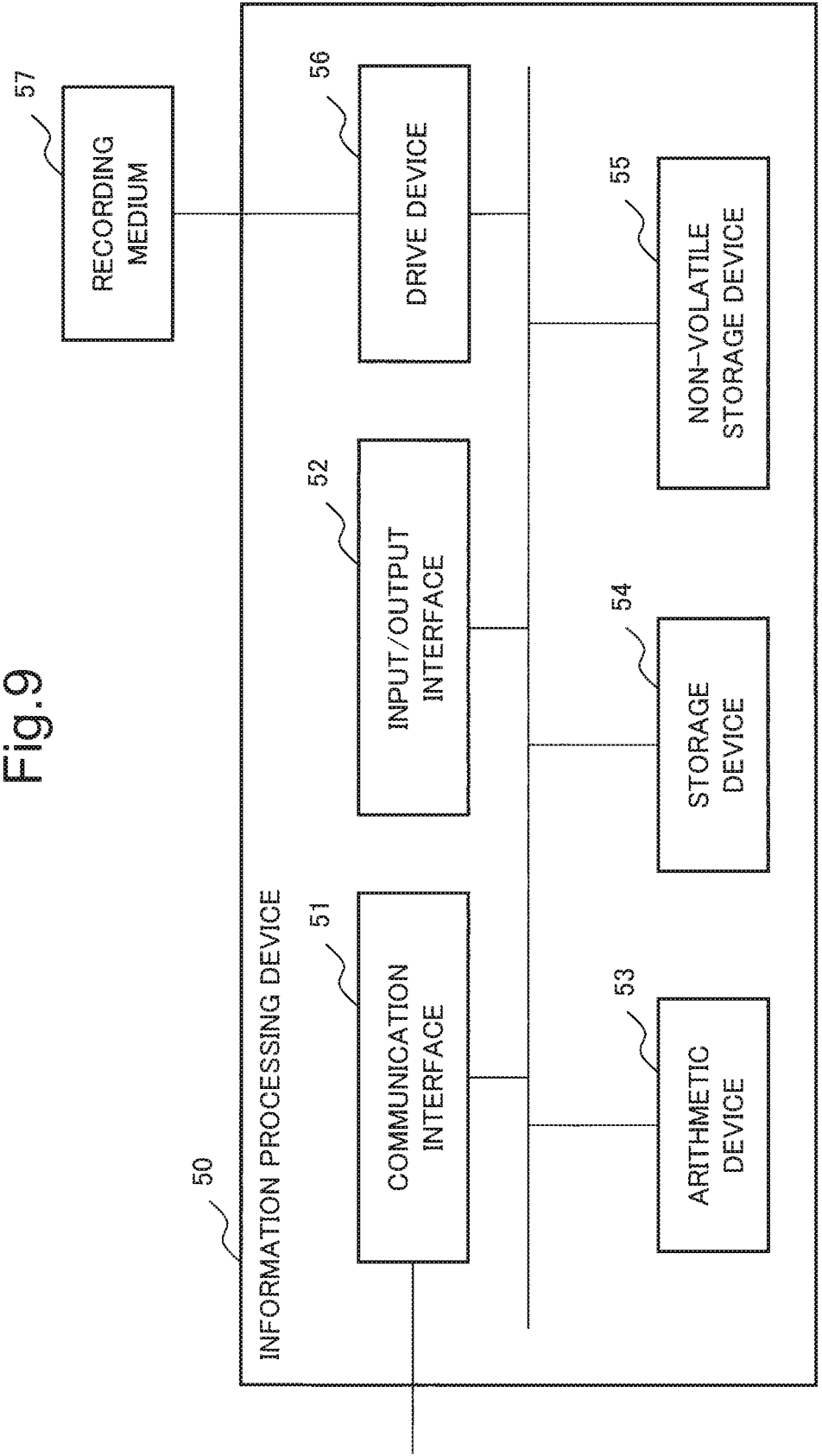
FIG. 9 shows an example of a hardware configuration of each exemplary embodiment of the present invention.
Figure 10:
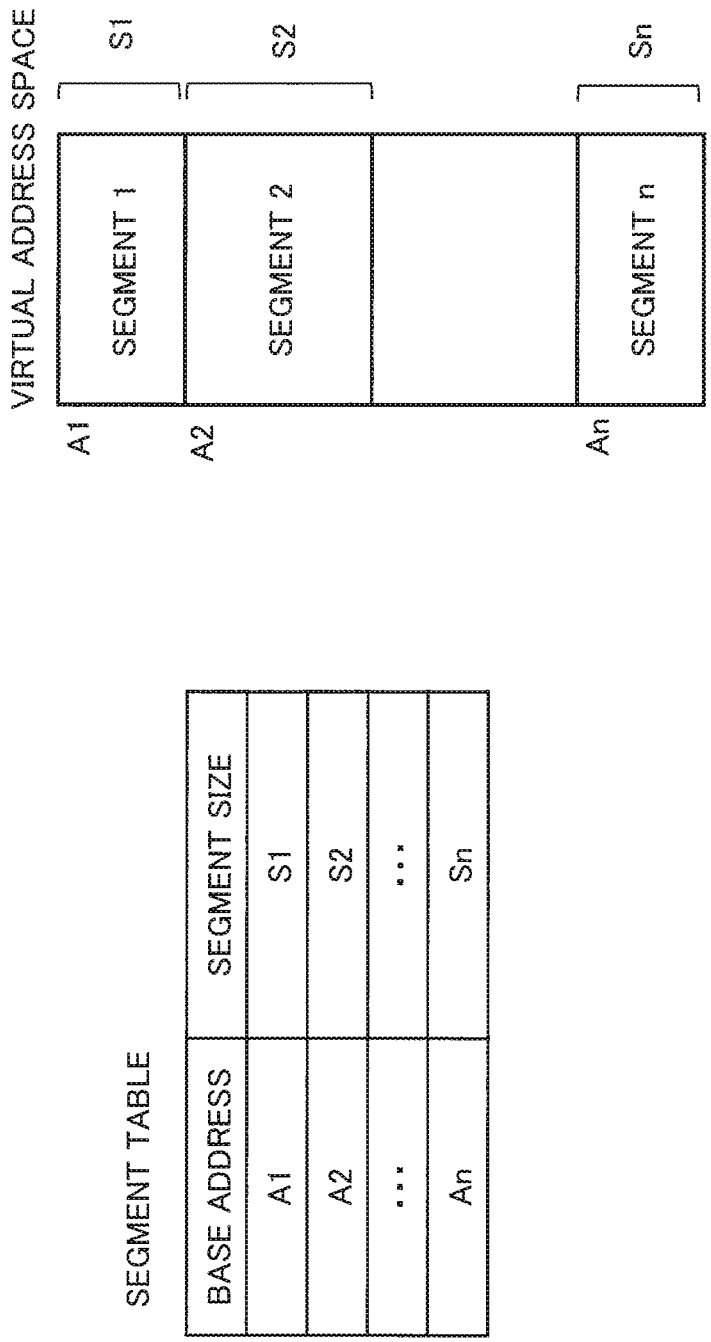
FIG. 10 shows an example of a segment table.
Figure 11:
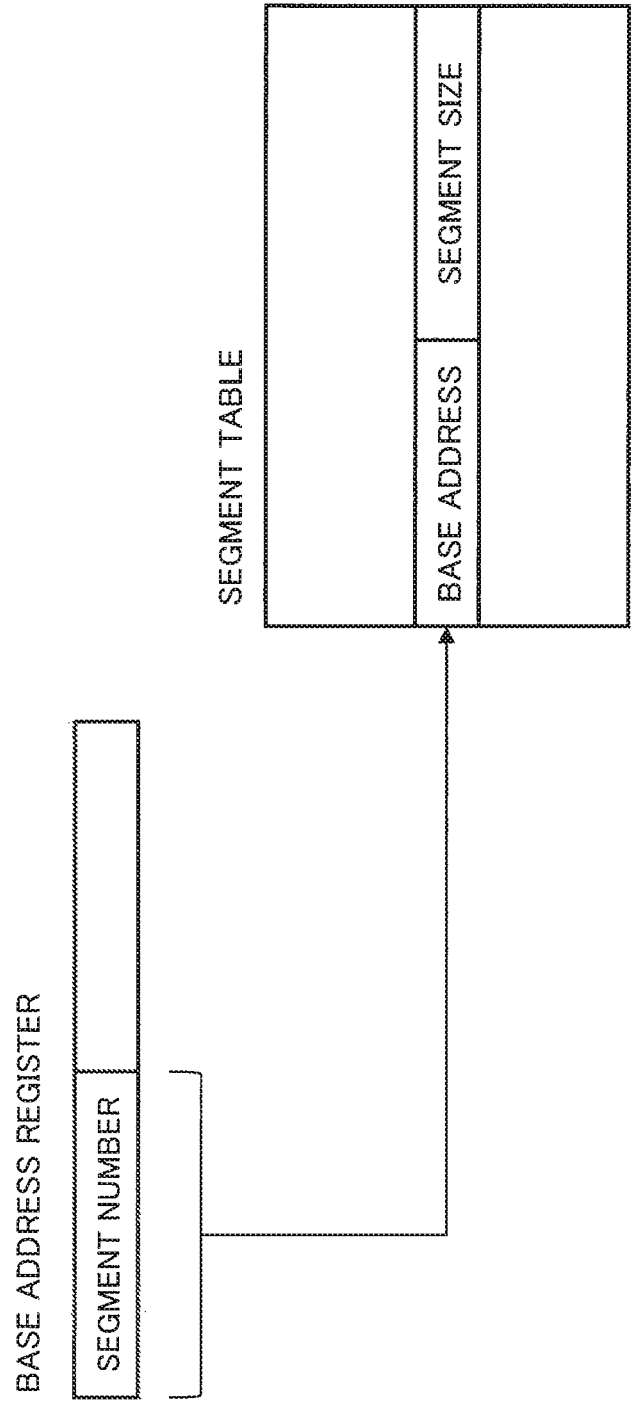
FIG. 11 shows an example of searching a segment table.
Figure 12:
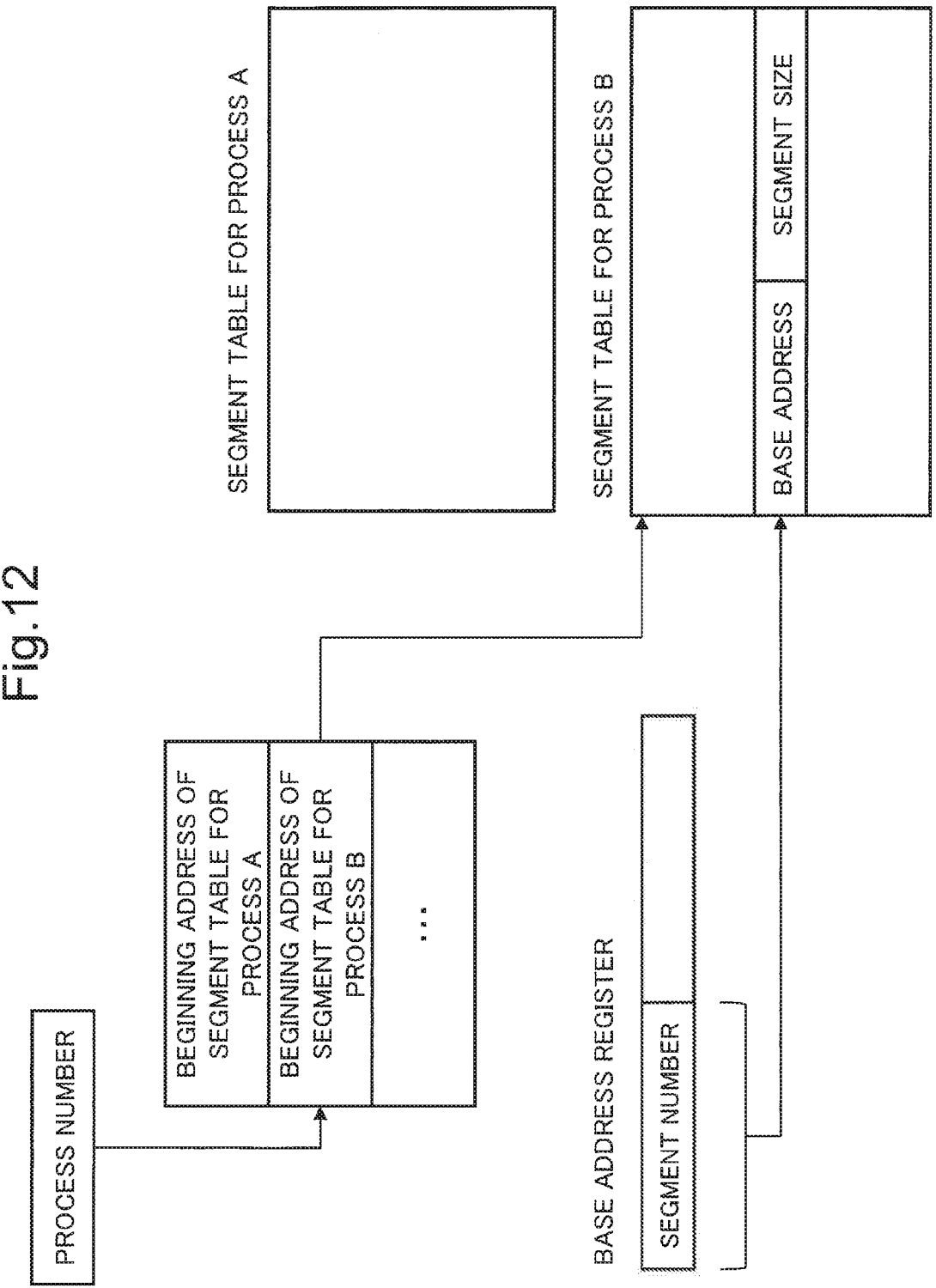
FIG. 12 shows an example of searching a segment table.
Figure 13:
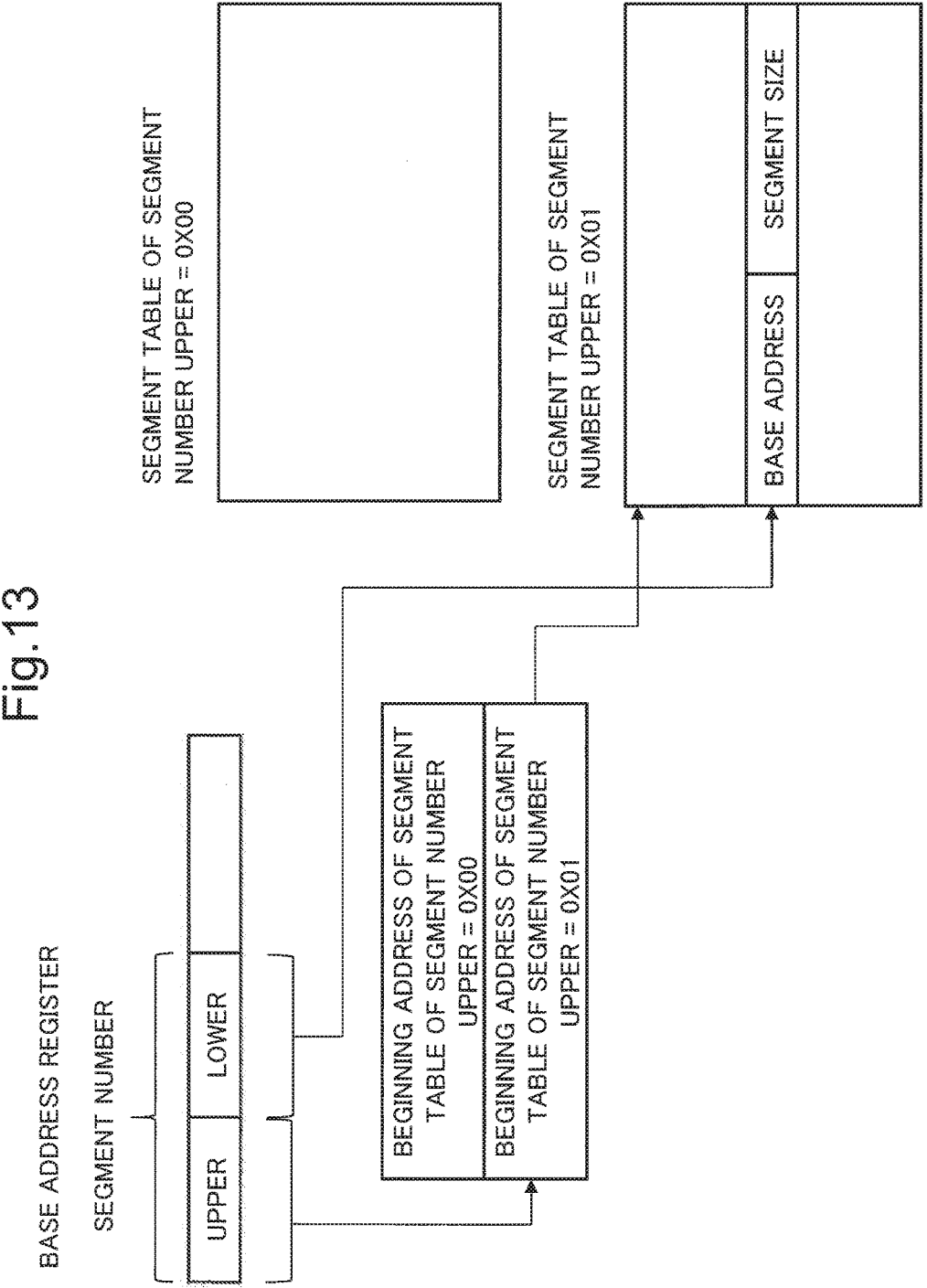
FIG. 13 shows an example of searching a segment table.

FIG. 9 is a figure schematically showing an example of the hardware configuration of the information processing device which can realize the out-of-range reference detection device according to each exemplary embodiment of the present invention. An information processing device 50 includes a communication interface 51, an input/output interface 52, an arithmetic device 53, a storage device 54, a non-volatile storage device 55, and a drive device 56.

The communication interface 51 is communication means by which the out-of-range reference detection device according to each exemplary embodiment communicates with an external device via wire and/or wireless communications. Further, when the out-of-range reference detection device is realized by using at least two information processing devices, these information processing devices may be connected to each other via the communication interface 51 so as to be communicable.

The input/output interface 52 is a man-machine interface such as a keyboard that is an example of an input device, a display that is an output device, or the like.

The arithmetic device 53 is an arithmetic processing device such as a general-purpose CPU (Central Processing Unit), a microprocessor, or the like. For example, the arithmetic device 53 can read various programs stored in the non-volatile storage device 55, store it in the storage device 54, and execute the process according to the read program.

The storage device 54 is a memory device such as a RAM (Random Access Memory) or the like which can be referred to by the arithmetic device 53 and stores the program, various data, and the like. The storage device 54 may be a volatile memory device.

The non-volatile storage device 55 is a non-volatile storage device such as a ROM (Read Only Memory), a flash memory, or the like and can store the various programs, data, and the like.

The drive device 56 is a device which reads data from a recording medium 57 mentioned later and writes data in the recording medium 57.

The recording medium 57 is an arbitrary recording medium such as an optical disk, a magneto optical disk, a semiconductor flash memory, or the like that can record data.

Each exemplary embodiment of the present invention may be realized by configuring the out-of-range reference detection device by using the information processing device 50 shown in FIG. 9 as an example and supplying the program which can realize the function described in each exemplary embodiment to the out-of-range reference detection device.

In this case, when the arithmetic device 53 executes the program supplied to the out-of-range reference detection device, the exemplary embodiment can be realized. Further, a part of, not all of the functions of the out-of-range reference detection device can be realized by using the information processing device 50.

Further, a configuration in which the above-mentioned program is recorded in the recording medium 57 and the program is appropriately stored in the non-volatile storage device 55 in the shipping stage, the operation stage, or another stage of the out-of-range reference detection device may be used. Further, in this case, as a method for supplying the program, a method in which the above-mentioned program is installed in the out-of-range reference detection device by using a suitable jig in the production stage before the shipping, the operation stage, or another stage may be used. Further, as a method for supplying the program, a commonly used procedure in which the program is downloaded from an external device via a communication line such as the Internet or the like may be used.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

An out-of-range reference detection device comprising:
acquisition means for acquiring a mask value corresponding to a base address register number of a predetermined effective address from a mask value storage unit storing correspondence relationships between the base address register number of a base address register storing a base address of a segment and the mask value showing a size of a memory that can be continuously referred to from the base address, determination means for determining whether or not the effective address is outside the range of the mask value, and output means for outputting a result of the determination.

(Supplementary Note 2)

The out-of-range reference detection device described in Supplementary note 1, wherein, when the segment of the base address corresponding to the mask value and another segment can be continuously referred to, the mask value is equal to a total segment size of the another segment and the segment concerned.

(Supplementary Note 3)

The out-of-range reference detection device described in Supplementary note 1 or Supplementary note 2, further comprising generation means for generating the mask value and storing it in the mask value storage unit.

(Supplementary Note 4)

The out-of-range reference detection device described in Supplementary note 3, wherein, when the effective address is outside the range of the mask value and the mask value is equal to an initial value, the generation means generates a new mask value, the determination means further determines whether or not the effective address is outside the range of the new mask value, and the output means outputs a result of the determination in which the new mask value is used.

(Supplementary Note 5)

The out-of-range reference detection device described in Supplementary note 4, wherein the initial value of the mask value is smaller than the minimum size of the segment.

(Supplementary Note 6)

The out-of-range reference detection device described in Supplementary note 4, wherein the initial value of the mask value is smaller than the segment size of each segment by a predetermined value.

(Supplementary Note 7)

An out-of-range reference detection method comprising:

acquiring a mask value corresponding to a base address register number of a predetermined effective address from a mask value storage unit storing correspondence relationships between the base address register number of a base address register storing a base address of a segment and the mask value showing a size of a memory that can be continuously referred to from the base address, determining whether or not the effective address is outside the range of the mask value, and outputting a result of the determination.

(Supplementary Note 8)

The out-of-range reference detection method described in Supplementary note 7, wherein, when the segment of the base address corresponding to the mask value and another segment can be continuously referred to, the mask value is equal to a total segment size of the another segment and the segment concerned.

(Supplementary Note 9)

The out-of-range reference detection method described in Supplementary note 7 or Supplementary note 8, wherein the mask value is generated and stored in the mask value storage unit.

(Supplementary Note 10)

The out-of-range reference detection method described in Supplementary note 9, wherein, when the effective address is outside the range of the mask value and the mask value is equal to an initial value, a new mask value is generated, it is determined whether or not the effective address is outside the range of the new mask value, and a result of the determination in which the new mask value is used is outputted.

(Supplementary Note 11)

The out-of-range reference detection method described in Supplementary note 10, wherein the initial value of the mask value is smaller than the minimum size of the segment.

(Supplementary Note 12)

The out-of-range reference detection method described in Supplementary note 10, wherein the initial value of the mask value is smaller than the segment size of each segment by a predetermined value.

(Supplementary Note 13)

An out-of-range reference detection program, wherein the program causes a computer to realize an acquisition function to acquire a mask value corresponding to a base address register number of a predetermined effective address from a mask value storage unit storing correspondence relationships between the base address register number of a base address register storing a base address of a segment and the mask value showing a size of a memory that can be continuously referred to from the base address, a determination function to determine whether or not the effective address is outside the range of the mask value, and an output function to output a result of the determination.

(Supplementary Note 14)

The out-of-range reference detection program described in Supplementary note 13, wherein, when the segment of the base address corresponding to the mask value and another segment can be continuously referred to, the mask value is equal to a total segment size of the another segment and the segment concerned.

(Supplementary Note 15)

The out-of-range reference detection program described in Supplementary note 13 or Supplementary note 14, wherein the out-of-range reference detection program causes the computer to realize a generation function to generate the mask value and store it in the mask value storage unit.

(Supplementary Note 16)

The out-of-range reference detection program described in Supplementary note 15, wherein, when the effective address is outside the range of the mask value and the mask value is equal to an initial value, the generation function generates a new mask value, the determination function determines whether or not the effective address is outside the range of the new mask value, and the output function outputs a result of the determination in which the new mask value is used.

(Supplementary Note 17)

The out-of-range reference detection program described in Supplementary note 16, wherein the initial value of the mask value is smaller than the minimum size of the segment.

(Supplementary Note 18)

The out-of-range reference detection program described in Supplementary note 16, wherein the initial value of the mask value is smaller than the segment size of each segment by a predetermined value.

(Supplementary Note 19)

A computer-readable recording medium recording the out-of-range reference detection program described in any one of Supplementary note 13 to Supplementary note 18.

The invention claimed is:

1. An out-of-range reference detection device comprising:
   an acquisition processor that acquires a mask value corresponding to a base address register number of a predetermined effective address from a mask value storage unit storing correspondence relationships between the base address register number of a base address register storing a base address of a segment and the mask value showing a size of a memory that can be continuously referred to from the base address,
   a determination processor that determines whether or not the effective address is outside the range of the mask value, and
   an outputs processor that output a result of the determination.

2. The out-of-range reference detection device described in claim 1, wherein, when the segment of the base address corresponding to the mask value and another segment can be continuously referred to, the mask value is equal to a total segment size of another segment and the segment concerned.

3. The out-of-range reference detection device described in claim 1, further comprising a generation processor that generates the mask value and storing it in the mask value storage unit.

4. The out-of-range reference detection device described in claim 3, wherein, when the effective address is outside the range of the mask value and the mask value is equal to an initial value,
   the generation processor generates a new mask value,
   the determination processor further determines whether or not the effective address is outside the range of the new mask value, and
   the output processor outputs a result of the determination in which the new mask value is used.

5. The out-of-range reference detection device described in claim 4, wherein the initial value of the mask value is smaller than the minimum size of the segment.

6. The out-of-range reference detection device described in claim 4, wherein the initial value of the mask value is smaller than the segment size of each segment by a predetermined value.

7. An out-of-range reference detection method comprising:
   acquiring a mask value corresponding to a base address register number of a predetermined effective address from a mask value storage unit storing correspondence relationships between the base address register number of a base address register storing a base address of a segment and the mask value showing a size of a memory that can be continuously referred to from the base address,
   determining whether or not the effective address is outside the range of the mask value, and
   outputting a result of the determination.

8. The out-of-range reference detection method described in claim 7, wherein, when the segment of the base address corresponding to the mask value and another segment can be continuously referred to, the mask value is equal to a total segment size of the another segment and the segment concerned.

9. The out-of-range reference detection method described in claim 7, wherein, when the effective address is outside the range of the mask value and the mask value is equal to an initial value,
   a new mask value is generated,
   it is determined whether or not the effective address is outside the range of the new mask value, and
   a result of the determination in which the new mask value is used is outputted.

10. A computer-readable recording medium recording the out-of-range reference detection program, wherein the program causes a computer to realize
    an acquisition function to acquire a mask value corresponding to a base address register number of a predetermined effective address from a mask value storage unit storing correspondence relationships between the base address register number of a base address register storing a base address of a segment and the mask value showing a size of a memory that can be continuously referred to from the base address,
    a determination function to determine whether or not the effective address is outside the range of the mask value, and
    an output function to output a result of the determination.

* * * * *